United States Patent
Hoffmann

(10) Patent No.: US 8,806,317 B2
(45) Date of Patent: Aug. 12, 2014

(54) METHOD FOR CODING AND DECODING DIGITAL DATA, PARTICULARLY DATA PROCESSED IN A MICROPROCESSOR UNIT

(75) Inventor: Lars Hoffmann, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 147 days.

(21) Appl. No.: 13/379,363

(22) PCT Filed: Jun. 22, 2010

(86) PCT No.: PCT/EP2010/058839
§ 371 (c)(1),
(2), (4) Date: Dec. 20, 2011

(87) PCT Pub. No.: WO2010/149663
PCT Pub. Date: Dec. 29, 2010

(65) Prior Publication Data
US 2012/0110413 A1    May 3, 2012

(30) Foreign Application Priority Data
Jun. 23, 2009    (DE) .................. 10 2009 029 979

(51) Int. Cl.
   *H03M 13/00*    (2006.01)
(52) U.S. Cl.
   USPC ........................... 714/801; 714/758; 714/785
(58) Field of Classification Search
   USPC .................. 714/801, 758, 785, 746, 768, 782
   See application file for complete search history.

(56) References Cited

U.S. PATENT DOCUMENTS

| 4,809,273 | A | 2/1989 | Jackowski et al. |
| 5,659,552 | A | 8/1997 | Ke et al. |
| 7,421,642 | B2 * | 9/2008 | Williamson et al. ......... 714/785 |
| 2003/0192005 | A1 * | 10/2003 | Williamson et al. ......... 714/758 |
| 2006/0236211 | A1 | 10/2006 | Shieh et al. |
| 2008/0215956 | A1 * | 9/2008 | Williamson et al. ......... 714/785 |

FOREIGN PATENT DOCUMENTS

| EP | 0280013 | 8/1988 |
| EP | 0769703 | 4/1997 |

OTHER PUBLICATIONS

International Search Report in PCT/EP2010/058839, Aug. 10, 2010.
German Search Report in corresponding Application No. 10 2009 029 979.3 dated Feb. 26, 2010.

* cited by examiner

Primary Examiner — Fritz Alphonse
(74) Attorney, Agent, or Firm — Workman Nydegger

(57) ABSTRACT

The invention relates to a method for encoding digital data, in particular of data processed in a microprocessor unit. In the method according to the invention for a respective data word (A, B, C) of a series of data words to be encoded subsequently a parity code (P(A), P(B), P(C)) is computed on the basis of the data of the respective data word (A, B, C). Further the respective data word (A, B, C) is altered with the aid of the data word (A, B, C) preceding it in the series, wherein the altered data word (Aa, Ba, Ca) and the parity code (P(A), P(B), P(C)) represent the encoded data word (Ac, Bc, Cc) and the encoded data word (Ac, Bc, Cc) can be decoded with the aid of the data word (A, B, C) preceding it in the series.

15 Claims, 2 Drawing Sheets

Figure 1:
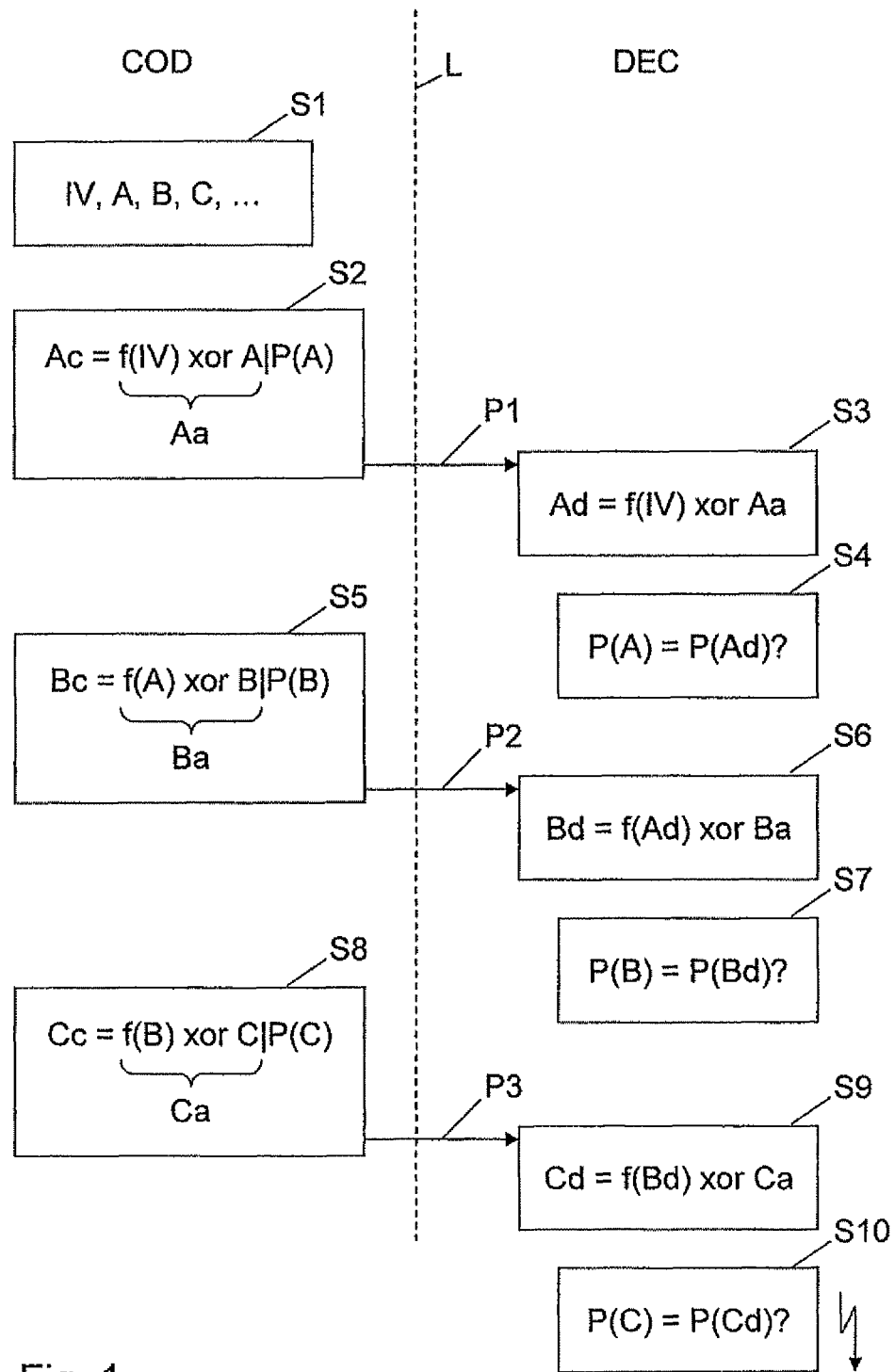

| i | X[i] | f(X[i-1]) | X[i] xor f(X[i-1]) \| P(X[i]) | f(Y[i-1]) | Y[i] | P(Y[i]) | PCheck | err | f(...f(err)) |
|---|---|---|---|---|---|---|---|---|---|
| 0 | 1010 | - | - | - | - | - | - | - | - |
| 1 | 0001 | 0111 | 0110\|1 | 0111 | 0001 | 1 | OK | - | - |
| 2 | 1101 | 0010 | 1111\|1 | 0010 | 1101 | 1 | OK | - | - |
| 3 | 0100 | 1001 | 1011\|1 ! | 1001 | 0010 | 1 | OK | - | - |
| 4 | 0011 | 1000 | 1011\|0 | 0100 | 1111 | 0 | OK | 0110 | 1100 |
| 5 | 1100 | 0110 | 1010\|0 | 1101 | 0111 | 1 | Fehler | - | 1011 |

Fig. 2

METHOD FOR CODING AND DECODING DIGITAL DATA, PARTICULARLY DATA PROCESSED IN A MICROPROCESSOR UNIT

The invention relates to a method for encoding digital data, in particular data processed in a microprocessor unit, as well as a corresponding method for decoding such data.

When digital data are transmitted it must be ensured in security-critical applications that unauthorized manipulations carried out on the data are detected. In particular in chip card controllers the detection of manipulations during the exchange of data between the individual functional units of the chip card is extremely important, since chip cards to a greater extent are subject to attacks which produce errors during the execution of chip card commands. The incorrectly executed commands and/or incorrectly transmitted data here partly allow conclusions regarding secrets used internally in the chip card, and possibly enable an access to protected data.

To detect manipulations and/or errors in the data transmission between different functional units the use of a so-called parity code is known. This code is co-transmitted in the form of one or several additional bits when the corresponding datum or data word is transmitted. Frequently the parity code is transmitted as a single parity bit, with the parity bit being set differently in dependence of whether an odd or an even number of ones is transmitted in the data word. The determination of a parity bit extends the data word to be transmitted only by 1 bit, but has the disadvantage that an error based on the parity information of an individual bit can be detected only with a probability of 50%. The probability of error detection can be raised through adding further parity bits, which e.g. calculate respectively the parity of a part of the data word, but thereby the amount of data to be transmitted increases.

It is the object of the invention to provide a method for encoding and a corresponding method for decoding data with which it is made possible that changes of the data can be detected securely and with a short error detection code.

This object is achieved through the method for encoding data according to patent claim 1 and/or the method for decoding data according to patent claim 8 and/or the encoding unit according to patent claim 10 and/or the decoding unit according to patent claim 12. Further developments of the invention are defined in the dependent claims.

In the encoding method according to the invention a parity code based on the respective data word is computed for a respective data word of a series of data words to be encoded subsequently. The computation of corresponding parity codes is sufficiently known from the state of the art and therefore is not explained in greater detail. The encoding method is characterized in that the respective data word is altered with the aid of the data word preceding it in the series, wherein the altered data word and the computed parity code represent the encoded data word and the encoded data word can be decoded with the aid of the preceding data word in the series.

The term "data word" is to be interpreted broadly here and in the following and applies to every datum with any arbitrary bit length. For encoding the first data word in the series, for which there exists no preceding data word, according to the invention a corresponding start value is used to alter the data word. This start value thus represents the preceding data word for the first data word of the series and is known both when encoding and when correspondingly decoding.

The method according to the invention in encoding or decoding takes account of the preceding data word of a respective data word. An occurring error or a manipulation during the data transmission is thereby propagated, so that an error can still be detected also by means of data words transmitted later on. This is not the case in the exclusive transmission of a parity code, since the parity code depends only on the data word just transmitted and not on preceding data words.

In a particularly preferred embodiment of the method according to the invention as parity code merely one single parity bit is used in encoding. Thereby the size of the encoded data word in comparison to the original data word is extended only slightly by 1 bit.

In a further embodiment of the method according to the invention the respective data word is altered on the basis of a modification of the data word preceding it in the series, with the modification being designed such that in any arbitrary manipulation of the respective encoded data word the parity code of a later data word to be encoded in the series after the respective encoded data word deviates from the parity code of the later, encoded and subsequently decoded data word. Any arbitrary modification here represents any arbitrary change of the content of a data word, however wherein the length of the data word remains unchanged. In this fashion a secure 100% error detection is guaranteed after a predetermined number of data-word transmissions carried out after the alteration of a data word. Through suitable design of the modification here the number of transmissions of data words carried out after a manipulation or an occurring error up to the detection of a parity deviation can be predetermined suitably. Nevertheless the manipulation or the error can be detected at an earlier stage by means of the parity check. However, at the latest the error detection takes place at the number of transmitted data words fixed via the modification.

In a particularly preferred embodiment the modification of the preceding data word is produced through applying a function to the preceding data word, and the altered data word is generated through an operation between the function value resulting from the application of the function and the respective data word, in particular through an XOR operation. The XOR operation here produces a bit value of 1 when the corresponding bits differ from the combined data, and otherwise the bit value 0. Preferably the function here is designed in such a fashion that it is linear with reference to the above-mentioned operation and the parity code of a data word differs from the parity code of a value which results from a number of subsequent executions of the function on the data word.

An example of the above-mentioned function in a variant of the invention is realized in that for a respective data word whose most significant bit is set to 0, the function value is formed through shifting the data word by a binary position in the direction of more significant bits, and for a respective data word whose most significant bit is set to 1 the function value is formed through shifting the data word by one binary position in the direction of more significant bits and subsequently performing an operation between the shifted data word and a primitive polynomial, with the operation in particular being an XOR operation.

In a particularly preferred embodiment the modification of the preceding data word can be produced with a linear feedback shift register, with such shift registers being sufficiently known from the state of the art and using the above-mentioned primitive polynomials. In implementing the function with the aid of a linear feedback shift register preferably polynomials with the smallest possible number of terms with coefficients=0 should be used, since then the implementation of the method in the form of corresponding hardware requires fewer gates.

In addition to the above-described encoding method the invention further encompasses a decoding method with which the series of data words previously encoded with the encoding method according to the invention is decoded. Here the data word contained in the respective decoded data word is altered with the aid of the decoded data word preceding it in the series, resulting in the decoded data word, with the parity code of the decoded data word being computed and compared to the parity code contained in the encoded data word, wherein, in the case that the compared parity codes differ from each other, a corresponding warning is generated, which is e.g. output and/or stored in a memory for reading out. In this fashion during the decoding a suitable detection of an error or of a manipulation takes place in the encoded data.

Moreover, the invention relates to a method for transmitting data from an emitter to a receiver, in particular in a microprocessor unit, with the data being encoded in the emitter with the above-described encoding method according to the invention, subsequently transmitted to the receiver and finally decoded with the above-described decoding method according to the invention.

The invention additionally encompasses an encoding unit designed in such a fashion that it has means with which every variant of the above-described encoding method can be carried out. Analogously the invention further relates to a decoding unit having means with which the above-described decoding method can be carried out.

The invention also encompasses an apparatus for processing data, in particular a microprocessor unit, with the apparatus encompassing the above-described encoding unit according to the invention as well as the above-described decoding unit according to the invention. During operation of the apparatus here the data encoded by the encoding unit are transmitted to the decoding unit and decoded by it. In the case that the apparatus is a microprocessor unit, preferably data are transmitted from a memory, which can be volatile or non-volatile, to the processor of the microprocessor unit and/or from the processor to a memory of the microprocessor unit.

In a particularly preferred variant the microprocessor unit is a controller of a portable data carrier, in particular a chip card controller.

Embodiments of the invention will be described in detail subsequently with reference to the enclosed figures.

The figures are described as follows:

FIG. 1 a schematic diagram showing the process of an embodiment of the method according to the invention for encoding and decoding data; and FIG. 2 a table illustrating the detection of a manipulation in a data transmission based on an embodiment of the invention.

In the following the method according to the invention will be described on the basis of the exchange of data in a chip card controller, with the data first being encoded in an encoder COD implemented in a corresponding memory of the chip card, for example in a RAM, ROM, EEPROM, flash memory and the like. The encoded data are transmitted to the microprocessor of the chip card controller for further processing, with a corresponding decoder DEC being implemented in the microprocessor for decoding the data. According to the invention also the reverse transmission path from the microprocessor to the memory is possible, if required, wherein in this case a corresponding encoder is implemented in the microprocessor and a corresponding decoder is implemented in the memory. If required, also other functional units in a chip card controller can communicate with each other via the method according to the invention. The method is further not limited to chip card controllers and can be applied to any arbitrary data transmissions between two units.

In FIG. 1 the individual process steps of an embodiment of the method according to the invention for transmitting data are indicated, with the steps carried out by the encoder COD being reproduced in the left part of the FIG. 1 and the steps carried out by the decoder DEC in the right part of FIG. 1. The encoder and the decoder here are separated from each other by a vertical dashed line L. The encoder COD and the decoder DEC each contain a unit which can compute a function P that serves to determine a parity bit, as well as a function f which will be explained in detail below. Further the encoder COD and the decoder DEC each contain a corresponding intermediate memory with the length of a data word that is required for encoding and decoding.

At the start of the method an identical start value IV (IV=initial value) for the encoder and the decoder is contained in the intermediate memory. The data to be encoded are present in the form of individual data words A, B, C, . . . and are transmitted in this order, however wherein the data can be stored in any arbitrary locations in the memory. The data words IV, A, B, C, . . . here always have the same data word width (i.e. bit length). The data can in particular represent commands read out from the memory and executed by the microprocessor of the chip card controller. According to FIG. 1 thus besides the start value IV the data words to be encoded A, B, C, . . . are present in the encoder at the start of the method indicated by the step S1.

To increase the probability of detection of an error or of a manipulation in the data transmission, in step S2 of FIG. 1 the data word A itself is not transmitted in combination with the parity bit P(A) transmitted beforehand via the function P, but the data word A is first altered with the aid of a function f, with the function f being applied to the start value IV and the altered data word Aa resulting from performing an XOR operation between the data word A and the function value f(IV). In later method steps the function f is always applied to the preceding data word in the series of data words to be encoded. In total, the altered data word Aa with the parity bit P(A) forms the encoded data word Ac. This data word is finally transmitted to the decoder DEC, as indicated through the arrow P1 in FIG. 1.

Subsequently in the decoder DEC the decoded data word Ad can be determined (step S3) in a simple fashion by performing an XOR operation between the altered data word Aa and the function value f(IV). Since the encoded data word Ac was possibly altered during the transmission and thus the decoded data word Ad is not consistent with the original data word A, in step S4 in the decoder DEC a parity check is carried out, in which the transmitted parity P(A) is compared to the parity P(Ad) of the decoded data word computed in the decoder. Up to this time the probability of detection of an error is still at 50%, since a difference between the two parity bits occurs with a probability of only 50% in the case of a change of the transmitted data. However, the function is constructed in such a fashion that in the data words transmitted later a change of the original data word A is detected in any case via a parity check.

Assuming that the parity bits P(A) and P(Ad) are consistent, the method is continued without generating a warning, with the subsequent data word B being encoded in the next step S5. For this purpose again the parity bit P(B) of the data word B is computed. Further the function f is now applied to the preceding data word A, with the resulting function value f(A) being XORed with the original data word B. This results in the altered data word Ba, which, together with the parity bit P(B), forms the encoded data word Bc. This is transmitted to the decoder DEC, as indicated through the arrow PI In the decoder then in step S6 the decoded data word Bd is determined by means of the function f, which is applied to the previously decoded data word Ad that is now stored in the intermediate memory of the decoder. The decoded data word here again results from performing an XOR operation between the function value f(Ad) and the altered data word Ba, i.e. the following is valid: Bd=f(Ad) xor Ba.

Finally in step S7 again a parity check takes place of the transmitted parity P(B) with the parity P(Bd) computed in the decoder. Through applying the function f to the preceding decoded data word Ad thereby a manipulation or an error is propagated in the data transmission. When in step S7 no deviation is detected in the parity check, again no warning is generated.

Subsequently the method is continued analogously as described above, i.e. in step S8 in the encoder COD for the subsequent data word C the corresponding encoded data word Cc is determined, which is composed of the altered data word Ca=f(B) xor C and the parity bit P(C). This data word is again transmitted to the decoder DEC, which is indicated through the arrow P3. Subsequently a decoding takes place, i.e. the decoded data word Cd=f(Bd) xor Ca is determined (step S9). Finally in step S10 again the parity check takes place, i.e. it is determined whether P(C) is consistent with P(Cd). In the embodiment described here now in the parity check in step S10 a discrepancy is found between the two parity bits, which is indicated through the serrated arrow in FIG. 1. Consequently a corresponding warning is generated, which can be stored and/or output in a suitable fashion, so as to inform the user thereby that an error or a manipulation has occurred in the data transmission.

The improvement of the detection of attacks according to the embodiment described above consists in the suitable choice of the function f, which, when a change of a transmitted encoded data word takes place, ensures for a data word transmitted later that the parity bits of the data word transmitted later on and the correspondingly decoded data word are no longer consistent. This is achieved through the condition $P(x) \neq P(f( \ldots (f(x)) \ldots ))$, with x representing any arbitrary data word with the data word width of the data words to be encoded.

Fundamentally the function f must have the following characteristics:
F is linear in GF ($2^{\wedge}$ data word width) (GF=Galois field);
$P(x) \neq P(f( \ldots (f(x)) \ldots ))$ for all data words x after a finite number of subsequent executions of f.

The number of finite subsequent executions therein can be predetermined in a suitable fashion, with a low number of subsequent executions leading to a faster detection of a data manipulation.

Assuming that the function f leads to an inversion of the parity bit after k-times subsequent execution, the following scenario results:

When there occurs an error in the transmission of the encoded data word Bc=f(Ad) xor B|P(B), the decoder DEC computes the function value f(A) with the previously intermediately stored value A and attempts to solve for B. Since B was transmitted incorrectly, the decoded value Bd does not correspond to the original value B, i.e. Bd=B'=B xor err is valid, with err corresponding to the error that occurred in the transmission. In case the subsequent parity check of the parity bit P(B') and P(B) does not lead to the detection of the error (i.e. if P(B)=P(B') is valid, the process is continued without warning, with the encoded value Cc=f(B) xor C|P(C) being transmitted in the next step.

The decoder now for the purpose of decoding does not compute f(B), but f(B') and, due to the above-defined linear characteristic off, obtains the decoded value C'=f(B) xor C xor f(B')=C xor f(err). Since the parity of C' changes in dependence of the error err only with a probability of 50%, also the new, wrong data word C' can possibly remain undetected. This results in a sequence of "wrong" transmitted data words. At the latest after the transmission of (k+1) data words, however, the error is recognized via the parity check due to the above characteristics of f, whereupon a corresponding warning is generated.

In the following the carrying out of the method according to the invention is explained with reference to an f function, which can be produced with the aid of an LFSR register (LFSR=linear feedback shift register).

The following is valid:
f(x)=(x<<1), if Msb(x)=0,
(x<<1) xor PrimPol, if Msb(x)=1,
with the following definitions:
<< bitwise shifting of the value by one binary position toward the left, i.e. toward more significant bits
Msb: most significant bit
PrimPol: primitive polynomial covering $2^{\wedge}$bus width, wherein subsequently PrimPol(x)=$x^{\wedge}4+x+1$ is valid, i.e. it is XORed with 0x13.

Here a bus with of four bits is considered, i.e. a data word to be transmitted consists of four bits. In the table of FIG. 2 the values resulting from the use of the above function f in encoding and decoding are reproduced. In the first column the steps i=0, 1, . . . , 5 for transmitting five subsequent data words are specified. The data words transmitted in every transmission step are designated in the second column of the table with X[i] (i=1, 2, . . . , 5). The start value IV stored in the encoder and the decoder here represents the data word X[0]. The corresponding function value resulting from the preceding data word is designated with f(X[i−1]) in the third column of the table. The encoded and transmitted value X[i] xor f(X[i−1]) P(X[i]) based thereon is specified in the fourth column. In the fifth column there are contained the function values f(Y[i]) determined on the part of the decoder. In the sixth column the decoded data word Y[i] is reproduced. Provided that no transmission errors occur, X[i]=Y[i] is valid. In the seventh column the parity P(Y[i]) of the decoded data word is specified. The eighth column, designated as PCheck, contains the result of the parity check, with OK meaning that the checked parities P(X[i]) and P(Y[i]) are consistent and "error" meaning that the checked parities are not consistent. In the ninth column an error err occurring during the data transmission is reproduced. The tenth column contains the value of the subsequent execution of the function f based on the error err, i.e. f( . . . f(err)).

The method is initialized at i=0 with the start value IV=1010. In step i=1 the first data word 0001 is transmitted and subsequently decoded. In this transmission no error occurs, so that the status of the parity check is OK. In the data transmission in the next step the data word 1101 is again transmitted in an error-free fashion, so that also regarding this transmission no discrepancy results from the parity check on the part of the decoder. Finally at i=3 an error occurs in the data transmission. The data word 0100 to be transmitted originally is manipulated during the transmission, so that the decoder receives the data word 1011|1 instead of 1101|1. The occurrence of the error is marked with an exclamation mark in the corresponding entry in the fourth column. However, this error is not detected in step i=3, since the parity bit of the decoded data word Y[i] corresponds to the parity bit of the data word X[i].

In step i=4 the sequence 0011 is transmitted as the next data word, with the preceding error being propagated due to the use of the function value f(Y)[i−1]) on the part of the decoder. In step i=4 again the error is not detected either, since the parity bit of the decoded data word is again consistent with the parity bit of the transmitted data word. In step i=5 the error is finally detected, since now the parity bit of the decoded data word has the value 1, whereas the parity bit of the transmitted data word has the value 0.

As results from the table of FIG. 2, thus the error introduced when i=3 initially remains undetected, since it was parity-maintaining despite the alteration of the data word. Due to the modification of the encoded data words with the function f the error is propagated, however. When an inversion of the parity takes place in the propagation of the error, the error is detected. With the aid of the above function that can be realized via a linear feedback shift register such an inversion of the parity and thereby a detection of the error can be guaranteed.

The method according to the invention described above has a number of advantages. In particular an error occurring in the data transmission can be securely detected at the latest at a predetermined number of transmitted data words. In contrast thereto in an error recognition based only on a parity bit an error remaining undetected at first can no longer be determined later. Further the probability of error detection in every transmitted data word is only 50%, so that the detection of an error cannot be guaranteed.

The invention claimed is:

1. A method for encoding digital data using a microprocessor comprising the steps:
   computing a parity code (P(A), P(B), P(C)) for a respective data word (A, B, C) of a series of data words to be encoded in a sequence, the parity code (P(A), P(B), P(C)) being computed on the basis of the data of the respective data word (A, B, C);
   altering the respective data word (A, B, C) with the aid of the data word (A, B, C) preceding it in the series, with the altered data word (Aa, Ba, Ca) and the parity code (P(A), P(B), P(C) representing the encoded data word (Ac, Bc, Cc); and
   decoding the encoded data word (Ac, Bc, Cc) with the aid of the data word (A, B, C) preceding it in the series.

2. The method according to claim 1, wherein the parity code (P(A), P(B), P(C)) is a parity bit.

3. The method according to claim 1, including altering the respective data word (A, B, C) on the basis of a modification (f(A), f(B), f(C)) of the data word (A, B, C) preceding it in the series, with the modification (f(A), f(B), f(C)) being designed in such a fashion that in any arbitrary alteration of the respective encoded data word (Ac, Bc, Cc) the parity code (P(A), P(B), P(C)) of a later data word (A, B, C) to be encoded in the series after the respective encoded data word (Ac, Bc, Cc) diverts from the parity code (P(Ad, Bd, Cd)) of the later, encoded and subsequently decoded data word (Ad, Bd, Cd).

4. The method according to claim 3, including generating the modification (f(A), f(B), f(C)) of the preceding data word (A, B, C) through applying a function to the preceding data word (A, B, C) and generating the altered data word is by performing an operation between the function value (f(A), f(B), f(C)) resulting from applying the function and the respective data word (A, B, C).

5. The method according to claim 4, including designing the function in such a fashion that it is linear with reference to the operation and the parity code (P(A), P(B), P(C)) of a data word diverts from the parity code of a value resulting from a number of subsequent executions of the function on the data word.

6. The method according to claim 4, including designing the function so that for a respective data word (A, B, C), whose most significant bit is set to 0, the function value (f(A), f(B), f(C)) is formed through shifting the data word (A, B, C) by a binary position in the direction of more significant bits, and for a respective data word (A, B, C) whose most significant bit is set to 1, the function value (f(A), f(B), f(C)) is formed through shifting the data word (A, B, C) by a binary position in the direction of more significant bits and subsequently performing an operation between the shifted data word and a primitive polynomial, with the operation being in particular an XOR operation.

7. The method according to claim 3, including generating the modification (f(A), f(B), f(C)) with a linear feedback shift register.

8. A decoding method for decoding a series of encoded data words (Ac, Bc, Cc) using a microprocessor, the series of encoded data words (Ac, Bc, Cc) having been previously encoded with the method recited in claim 1, the decoding method comprising:
   altering the altered data word (Aa, Ba, Ca) contained in a respective previously encoded data word (Ac, Bc, Cc) with the aid of the data word (Ad, Bd, Cd) preceding it in the series, from which there results the decoded data word (Ad, Bd, Cd), with the parity code (P(Ad), (Bd), (Cd)) of the decoded data word (Ad, Bd, Cd) being computed and compared to the parity code (P(A), P(B), P(C)) contained in the previously encoded data word (Ac, Bc, Cc),
   wherein, if the compared parity codes (P(A), P(B), P(C); P(Ad), (Bd), (Cd)) differ from each other, a warning is generated.

9. A method for transmitting data from an emitter (COD) to a receiver (DEC), comprising the steps:
   encoding data (A, B, C) that are encoded in accordance with the method recited in claim 1 in the emitter (COD), the encoded data (Ac, Bc, Cc) being transmitted to the receiver (DEC) and decoded in the receiver (DEC) with the method recited in claim 8.

10. An encoding unit, configured to carry out a method comprising the steps:
    computing a parity code (P(A), P(B), P(C)) for a respective data word (A, B, C) of a series of data words to be encoded in a sequence, the parity code (P(A), P(B), P(C)) being computed based on the data of the respective data word (A, B, C);
    altering the respective data word (A, B, C) with the aid of the data word (A, B, C) preceding it in the series, wherein the altered data word (Aa, Ba, Ca) and the parity code (P(A), P(B), P(C)) represents the encoded data word (Ac, Bc, Cc); and
    decoding the encoded data word (Ac, Bc, Cc) with the aid of the data word (A, B, C) preceding it in the series.

11. The encoding unit according to claim 10, wherein the encoding unit (COD) is configured to carry out a method including the steps:
    computing for a respective data word (A, B, C) of a series of data words to be encoded subsequently a parity code (P(A), P(B), P(C)) on the basis of the data of the respective data word (A, B, C);
    altering the respective data word (A, B, C) with the aid of the data word (A, B, C) preceding it in the series, with the altered data word (Aa, Ba, Ca) and the parity code (P(A), P(B), P(C) representing the encoded data word (Ac, Bc, Cc); and
    decoding the encoded data word (Ac, Bc, Cc) with the aid of the data word (A, B, C) preceding it in the series.

12. A decoding unit, configured to carry out the method having the steps: decoding a series of data words (Ac, Bc, Cc) previously encoded with the method recited in claim 1, wherein the altered data word (Aa, Ba, Ca) contained in a respective encoded data word (Ac, Bc, Cc) is altered with the aid of the decoded data word (Ad, Bd, Cd) preceding it in the series, from which there results the decoded data word (Ad, Bd, Cd), with the parity code (P(Ad), (Bd), (Cd)) of the decoded data word (Ad, Bd, Cd) being computed and compared with the parity code (P(A), P(B), P(C)) contained in the encoded data word (Ac, Bc, Cc), wherein, in the case that the compared parity codes (P(A), P(B), P(C); P(Ad), (Bd), (Cd)) differ from each other, a warning is generated.

13. An apparatus for processing data, comprising an encoding unit (COD) and a decoding unit (DEC) as recited in claim 12,
   wherein the encoding is configured to carry out a method including the steps:
   computing for a respective data word (A, B, C) of a series of data words to be encoded subsequently a parity code (P(A), P(B), P(C)) based on the data of the respective data word (A, B, C) is;
   altering the respective data word (A, B, C) with the aid of the data word (A, B, C) preceding it in the series, wherein the altered data word (Aa, Ba, Ca) and the parity code (P(A), P(B), P(C)) represents the encoded data word (Ac, Bc, Cc); and
   decoding the encoded data word (Ac, Bc, Cc) with the aid of the data word (A, B, C) preceding it in the series; and
   wherein during the operation of the apparatus the data (Ac, Bc, Cc) encoded by the encoding unit are transmitted to the decoding unit (DEC) and decoded by it.

14. The apparatus according to claim 13, wherein the apparatus is a microprocessor unit and during operation data are transmitted from a memory to the processor of the microprocessor unit and/ or from the processor to a memory of the microprocessor unit.

15. The apparatus according to claim 13, with the microprocessor unit comprising a controller of a portable data carrier.

* * * * *